United States Patent
Arduini

(10) Patent No.: US 7,924,579 B2
(45) Date of Patent: Apr. 12, 2011

(54) FLY-FORWARD CONVERTER POWER SUPPLY

(75) Inventor: Douglas Paul Arduini, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 557 days.

(21) Appl. No.: 12/026,350

(22) Filed: Feb. 5, 2008

(65) Prior Publication Data

US 2009/0196075 A1    Aug. 6, 2009

(51) Int. Cl.
  *H02M 3/335*    (2006.01)
(52) U.S. Cl. .................... 363/21.06; 363/21.14
(58) Field of Classification Search ............ 363/20, 363/21.01, 21.04, 21.06, 21.12, 21.14, 81, 363/82, 95, 97, 125
See application file for complete search history.

(56) References Cited

U.S. PATENT DOCUMENTS

| | | | | |
|---|---|---|---|---|
| 4,785,387 A | * | 11/1988 | Lee et al. | 363/21.03 |
| 5,434,768 A | * | 7/1995 | Jitaru et al. | 363/21.01 |
| 5,541,828 A | * | 7/1996 | Rozman | 363/21.1 |
| 5,636,107 A | | 6/1997 | Lu et al. | |
| 5,886,881 A | | 3/1999 | Xia et al. | |
| 6,304,463 B1 | | 10/2001 | Krugly | |

* cited by examiner

*Primary Examiner* — Adolf Berhane
(74) *Attorney, Agent, or Firm* — Patterson & Sheridan, LLP

(57) ABSTRACT

A fly-forward converter topology for a switched-mode power supply (SMPS) that may incorporate the advantages of both a forward converter and a flyback converter into a two-stage half-wave converter is provided. The fly-forward converter may be considered as a half-wave forward converter that has been modified with the addition of another secondary winding and a second rectifier, operating as a forward converter during the on period of the primary-side switch(es) and functioning as a flyback converter during the off period. Magnetizing energy stored in the core of the converter's transformer is not lost or recirculated in the primary, but may be transferred from the primary to the secondary. By transferring the transformer magnetizing energy to the secondary during the off period, the transformer core of the fly-forward converter may be reset without additional core resetting circuitry.

20 Claims, 8 Drawing Sheets

FLY-FORWARD CONVERTER POWER SUPPLY

BACKGROUND OF THE INVENTION

1. Field of the Invention

Embodiments of the present invention generally relate to DC-to-DC converters and, more particularly, to fly-forward converters capable of resetting the transformer core.

2. Description of the Related Art

DC-to-DC converters are devices used to convert a DC voltage at one level to a DC voltage at another level and may be used as power supplies to deliver power to a load. Such converters typically comprise a transformer, having primary and secondary windings wound around a common magnetic core. By opening and closing the primary circuit for appropriate intervals, control over the energy transfer between primary and secondary is accomplished.

Common DC-to-DC converter topologies include the forward converter and the flyback converter. In forward converters, a switch may be connected between the voltage source and the primary winding of the transformer to provide forward power transfer to the secondary winding of the transformer when the switch is on and conducting. In flyback converters, energy is accumulated in the transformer by closing the switch of the primary circuit and is subsequently released from the secondary winding by opening the switch.

To discharge the leakage inductance (i.e., the magnetizing energy) of the transformer in forward converters, the transformer core may be reset during the off period of the switch. Resetting is typically accomplished by employing additional circuitry, such as a third transformer winding in parallel with the primary transformer winding, or an inductor-capacitor (LC) resonant circuit electrically coupled to the secondary winding.

OVERVIEW

Embodiments of the present invention generally relate to a fly-forward converter that operates like a forward converter during the on period of the primary-side switch(es) and functions like a flyback converter during the off period.

One embodiment of the present invention provides an apparatus. The apparatus generally includes a transformer having a primary winding and a tapped secondary winding, the secondary winding having a first terminal, a second terminal, and a tap terminal; a first switching device coupled to the primary winding for generating changes in voltage across the primary winding such that the primary winding transfers energy to the secondary winding; an output inductor having first and second ends; a first rectifier coupled to the first terminal of the secondary winding and to the first end of the output inductor; an output capacitor coupled to the second end of the output inductor and to the tap terminal of the secondary winding; and a second rectifier coupled to the second terminal of the secondary winding and to the second end of the output inductor, wherein the polarity of the first rectifier from the first terminal of the secondary winding is the same as the polarity of the second rectifier from the second terminal of the secondary winding.

Another embodiment of the present invention provides an apparatus. The apparatus generally includes a transformer having a primary winding and a tapped secondary winding, the secondary winding having a first terminal, a second terminal, and a tap terminal; a means for switching coupled to the primary winding for generating changes in voltage across the primary winding such that the primary winding transfers energy to the secondary winding; an output inductor having first and second ends; a first means for rectifying coupled to the first terminal of the secondary winding and to the first end of the output inductor; an output capacitor coupled to the second end of the output inductor and to the tap terminal of the secondary winding; and a second means for rectifying coupled to the second terminal of the secondary winding and to the second end of the output inductor.

Yet another embodiment of the present invention provides a method. The method generally includes, in a first state, closing a switching device coupled to a primary winding of a transformer such that current flows through a load and a first rectifier coupled between a first end of an output inductor and a first terminal of a tapped secondary winding of the transformer; in a second state, opening the switching device such that current flows through the load and a second rectifier coupled between a second end of the output inductor and a second terminal of the secondary winding, wherein the load is coupled between the second end of the output inductor and a tap terminal of the secondary winding; and alternating between the first state and the second state.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Embodiments of the present invention provide a DC-to-DC converter topology for a switched-mode power supply (SMPS). The topology may provide the advantages of both a forward converter and a flyback converter into a two-stage half-wave converter referred to as a fly-forward converter.

The fly-forward converter may be considered as a half-wave forward converter that has been modified with the addition of another secondary winding and a second rectifier to function as a two-stage half-wave converter, operating as a forward converter during the on period of the primary-side switch(es) and functioning as a flyback converter during the off period. During the off period, the output voltage may be used to reset the transformer core and, for some embodiments, to provide an accurate output voltage sense on the primary. Magnetizing energy stored in the core of the converter's transformer is not lost or recirculated in the primary, but may be transferred from the primary to the secondary. By transferring the transformer magnetizing energy to the secondary during the off period, the transformer core of the fly-forward converter may be reset without additional core resetting circuitry. Also during the off period, a sample of the output voltage is present on the transformer primary for isolated voltage control sensing.

An Example Fly-Forward Converter Topology

Figure 1:
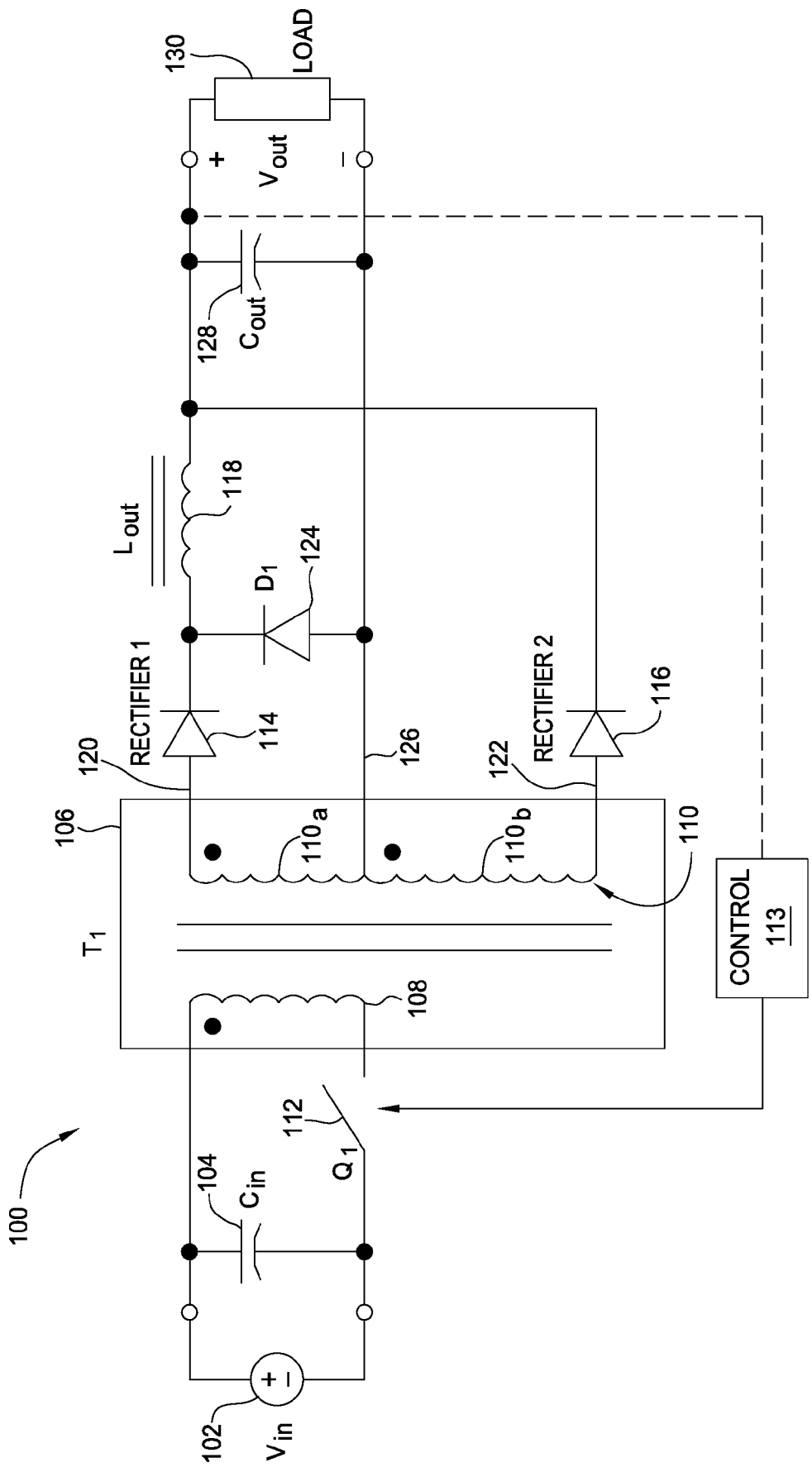
FIG. 1 illustrates a fly-forward converter topology for a single-ended positive output voltage in accordance with an embodiment of the present invention.

FIG. 1 illustrates a fly-forward converter topology 100 for converting an input voltage ($V_{in}$) to a single-ended positive output voltage ($V_{out}$). Represented by a direct current (DC) voltage source 102, $V_{in}$ may be filtered by any suitable filter circuits known to those skilled in the art, such as a pi filter or an inductor-capacitor (LC) filter, in an effort to remove high frequency components and provide clean input voltage to the converter. In FIG. 1, input bulk capacitance ($C_{in}$) 104 is electrically coupled in parallel with the voltage source 102 and may represent one or more capacitors. The input bulk capacitance 104 may comprise aluminum electrolytic, tantalum, and/or ceramic capacitors, for example.

The fly-forward converter topology 100 may include a transformer ($T_1$) 106 having a primary winding 108 and a tapped secondary winding 110 wound around a core in the turns ratio 1:N, where N is the ratio of secondary winding turns to primary winding turns. The core may have any suitable shape (e.g., a toroidal core, a pot core, or an E-I core) and may be composed of any suitable material, such as powdered iron or another ferrous material. For some embodiments, the transformer 106 may be shielded and/or potted. Also for some embodiments, the secondary winding 110 may be a center-tapped secondary winding such that a first portion 110a of the secondary winding has the same electrical length as a second portion 110b. The primary winding 108 may have the same winding configuration as the tapped secondary winding 110 such that the secondary current will be in phase with the primary current. This is illustrated by the dot convention in FIG. 1. Another configuration could be a current source from a C-L input.

The primary winding 108 may be electrically coupled in series with a switch ($Q_1$) 112, and the series combination of the primary winding 108 and the switch 112 may be electrically coupled in parallel with the input bulk capacitance 104 and the voltage source 102. The order of the primary winding 108 and the switch 112 may be reversed for some embodiments without affecting the general operation of the fly-forward converter. The switch 112 may comprise any suitable switching device capable of operating at the desired switching frequency (typically in the range of about 40 kHz to 250 kHz or higher), such as a metal oxide semiconductor field effect transistor (MOSFET), a bipolar junction transistor (BJT), or a solid state relay (SSR).

Closing and opening of the switch 112 may be managed by control logic 113, coupled to the switch 112. The control logic 113 may be part of a processor or a separate integrated circuit (IC), such as a pulse width modulation (PWM) controller. Operation of the switch is described in greater detail below.

The first portion 110a of the secondary winding may be coupled to a unidirectional device, such as a first rectifier 114.

The second portion 110b of the second winding may be coupled to another unidirectional device, such as a second rectifier 116. The first rectifier 114 may be coupled to an output inductor ($L_{out}$) 118 at one end, and the second rectifier 116 may be coupled to $L_{out}$ 118 at the other end. The winding of the output inductor 118 may be wound around a core of any suitable material, such as air, ceramic, plastic or magnetic materials (e.g., ferrite). The core may be a rod, a toroid or a pot core.

The first and second rectifiers 114, 116 may comprise silicon diodes, Schottky diodes, or the body diodes of MOSFETs. For some embodiments, the first and second rectifiers 114, 116 may be configured as synchronous rectifiers. As illustrated in FIG. 1 to produce a positive DC output voltage ($V_{out}$), the anode of the first rectifier 114 may be coupled to the first portion 110a of the secondary winding at a first terminal 120, and the cathode of the first rectifier 114 may be coupled to $L_{out}$ 118. Likewise, the anode of the second rectifier 116 may be coupled to the second portion 110b of the secondary winding at a second terminal 122, and the cathode of the second rectifier 116 may be coupled to $L_{out}$ 118.

The fly-forward converter topology 100 may also include a freewheeling diode ($D_1$) 124 (also known as a catch, flyback, suppressor, or snubber diode). The anode of the freewheeling diode 124 may be coupled to a tap terminal 126, and the cathode may be coupled to the cathode of the first rectifier 114 and $L_{out}$ 118. The freewheeling diode may comprise any suitable p-n junction, such as a silicon diode, a Schottky diode, or the body diode of a MOSFET.

Output bulk capacitance ($C_{out}$) 128 may be electrically coupled between the output inductor 118 and the tap terminal 126, in parallel with the output voltage ($V_{out}$) and a load 130. The output bulk capacitance 128 may represent one or more capacitors and may comprise any suitable capacitor(s) with low equivalent series resistance (ESR) for reducing the output ripple voltage, such as aluminum electrolytic, tantalum, and/or ceramic capacitors.

For some embodiments, a parameter on the secondary side of the fly-forward converter may be sensed and fed back to the control logic 113 for closed loop operation. This sensed parameter may include, for example, the output voltage ($V_{out}$), the output current, or the output power. For embodiments where isolation between the primary and secondary sides of the fly-forward converter is desired, the sensed parameter may be fed back across an isolation barrier through an optocoupler, a second transformer or a winding of the transformer 106.

Figure 1A:
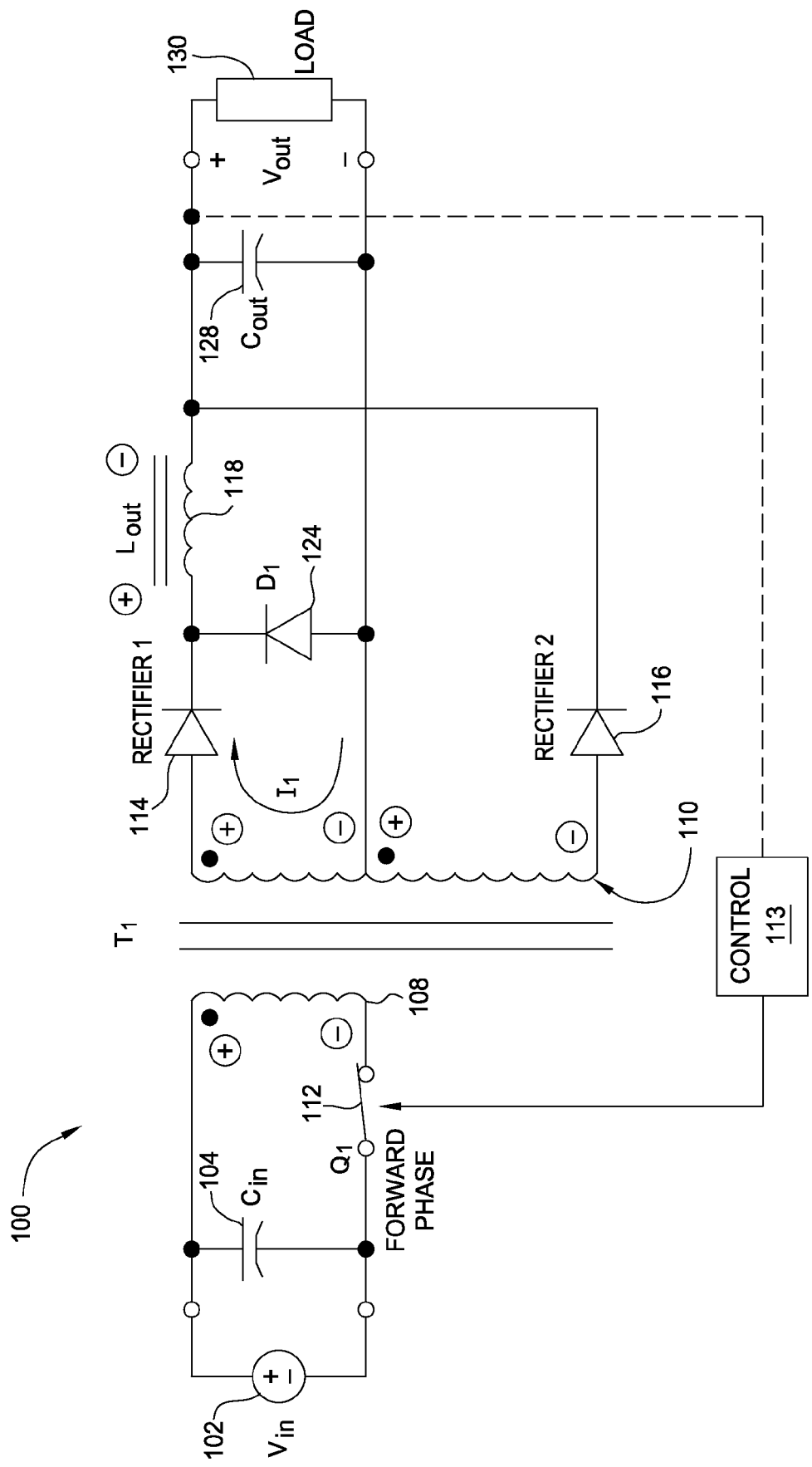
FIGS. 1A and 1B illustrate a forward phase and a flyback phase, respectively, of the topology in FIG. 1 in accordance with embodiments of the present invention.

Referring now to FIG. 1A, the operation of the fly-forward converter topology of FIG. 1 in a forward phase is illustrated. In the forward phase, the fly-forward converter behaves similar to the on period of a forward converter. The switch 112 may be closed in response to a signal from the control logic 113. The signal may be generated such that current rises linearly and flows through the primary winding 108 of the transformer 106 and a voltage drop is created across the primary winding 108 approximately equal to $V_{in}$. The flow of current may store magnetizing energy in the transformer core.

The change in primary winding voltage may generate a voltage across the secondary winding 110 according to the turns ratio of the transformer 106. Because the first rectifier 114 is forward-biased during the forward phase, a current $I_1$ may flow from the first portion 110a of the secondary winding through the first rectifier 114 and the output inductor 118 to the load 130. Higher frequency portions of the current $I_1$ may be shunted through the output bulk capacitance 128 before the current I1 returns from the load 130 to the first portion 110a of the secondary winding. Significant current should not flow in the second rectifier 116 or the freewheeling diode 124 since these components may most likely be reverse-biased during the forward phase. The voltages across the windings of the transformer and $L_{out}$ 118 may be as indicated in FIG. 1A.

Figure 1B:
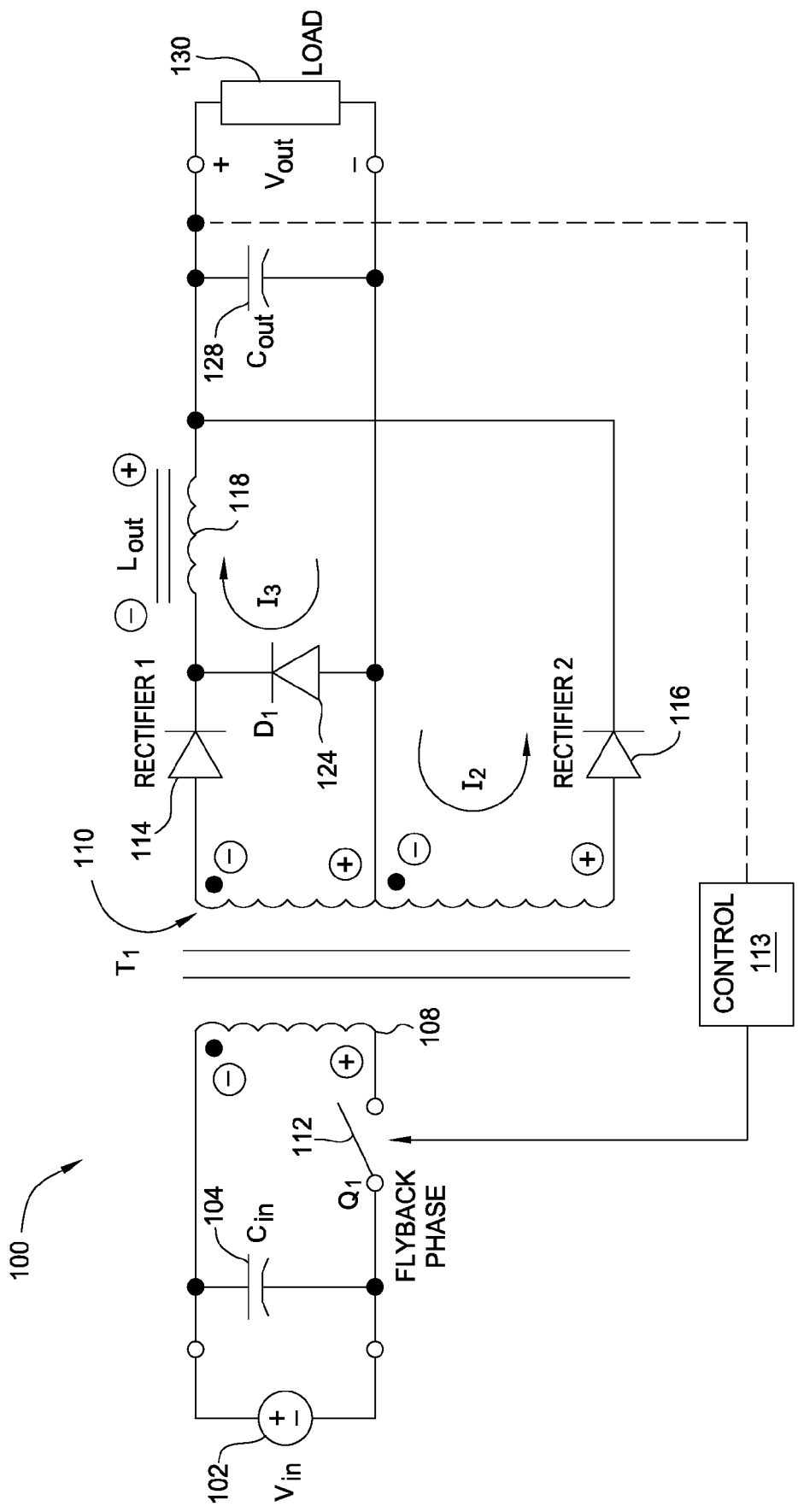

Once the control logic 113 determines the switch 112 should be opened according to the desired duty cycle or the feedback signal, for example, the switch 112 may be opened to enter the flyback phase as illustrated in FIG. 1B. When the switch 112 is opened, the transformer voltage polarities may reverse as shown because the transformer's magnetic field acts to maintain current flow. Because the second rectifier 116 is forward-biased during the flyback phase according to this polarity reversal, a current $I_2$ may flow from the second portion 110b of the secondary winding through the second rectifier 116 to the load 130 and back to the secondary winding through the tap terminal 126.

Furthermore, because the second rectifier 116 is coupled to the output bulk capacitance 128 and the output side of $L_{out}$ 118 rather than to the other side of $L_{out}$ 118 to which the first rectifier 114 is coupled, the magnetizing energy of the transformer core may be automatically dumped into the output bulk capacitance 128 during the flyback phase in an effort to reset the core. This is in contrast to conventional converters where the core cannot be immediately reset because the magnetizing energy has to be delivered through the output inductor 118, which has a magnetizing energy of its own. Thus, the magnetizing energy stored in the core may most likely not be lost or recirculated in the primary, but may be transferred to the secondary according to embodiments of the present invention. Furthermore, embodiments of the fly-forward converter described herein do not require additional circuitry (e.g., a secondary switch, an inductor-capacitor (LC) circuit, a diode and resistor-capacitor (RC) circuit, or other reset mechanism) to reset the transformer core, thereby reducing the size and cost of the converter when compared to conventional converters.

To reset the core, the switch should be closed according to the following equation:

$$t_{on}*V_p(1) \leq t_{off}*V_p(2)$$

where $t_{on}$ is the time the switch is closed during the forward phase, $t_{off}$ is the time the switch is open during the flyback phase, $V_p(1)$ is the voltage of the primary winding during the forward phase at approximately $V_{in}$, $V_p(2)$ is the voltage of the primary winding*n(reset) during the forward phase, and n(reset) is the turns ratio of the primary winding 108 to the flyback portion (i.e., the second portion 110b) of the secondary winding at approximately $V_{out}$.

By automatically resetting the transformer core, the primary side switch 112 may be considered to have an automatic virtual voltage clamp. Such a voltage clamp may lower the transient voltage stress across the switch 112, especially in embodiments where a transistor is used for the switch. This, in turn, may lower the maximum voltage requirement of such a switching transistor and may eliminate simplify snubber requirements for switch transient voltages.

Significant current should not flow in the first rectifier 114 since this rectifier may most likely be reverse-biased during the flyback phase. However, the polarity of the output inductor 118 may reverse as shown because the inductor's magnetic field acts to maintain current flow. Thus, the freewheeling diode 124 may be forward-biased and allow current $I_3$ to flow through the output inductor 118 during the flyback phase.

Besides the advantages of two-stage half-wave rectification and automatically resetting the transformer core, the fly-forward converter may possess a number of other advantages. For example, a higher magnetizing current may be allowed without a loss penalty, thereby allowing a smaller transformer core and a lower primary inductance. Smaller transformer cores are usually less expensive. Furthermore, the efficiency may be increased when compared to conventional converters since the magnetizing energy may be transferred without a switch. Power dissipation and heat may also be decreased.

For some embodiments, the duty cycle may exceed 50% by adjusting the flyback portion of the secondary winding of the transformer different than the forward portion of the secondary winding. Some embodiments may utilize output voltage sensing on the primary winding of the transformer during the off period. The fly-forward converter may also enjoy a decreased output voltage ripple when compared to conventional single-ended converters.

Another Example Fly-Forward Converter Topology

Figure 2:
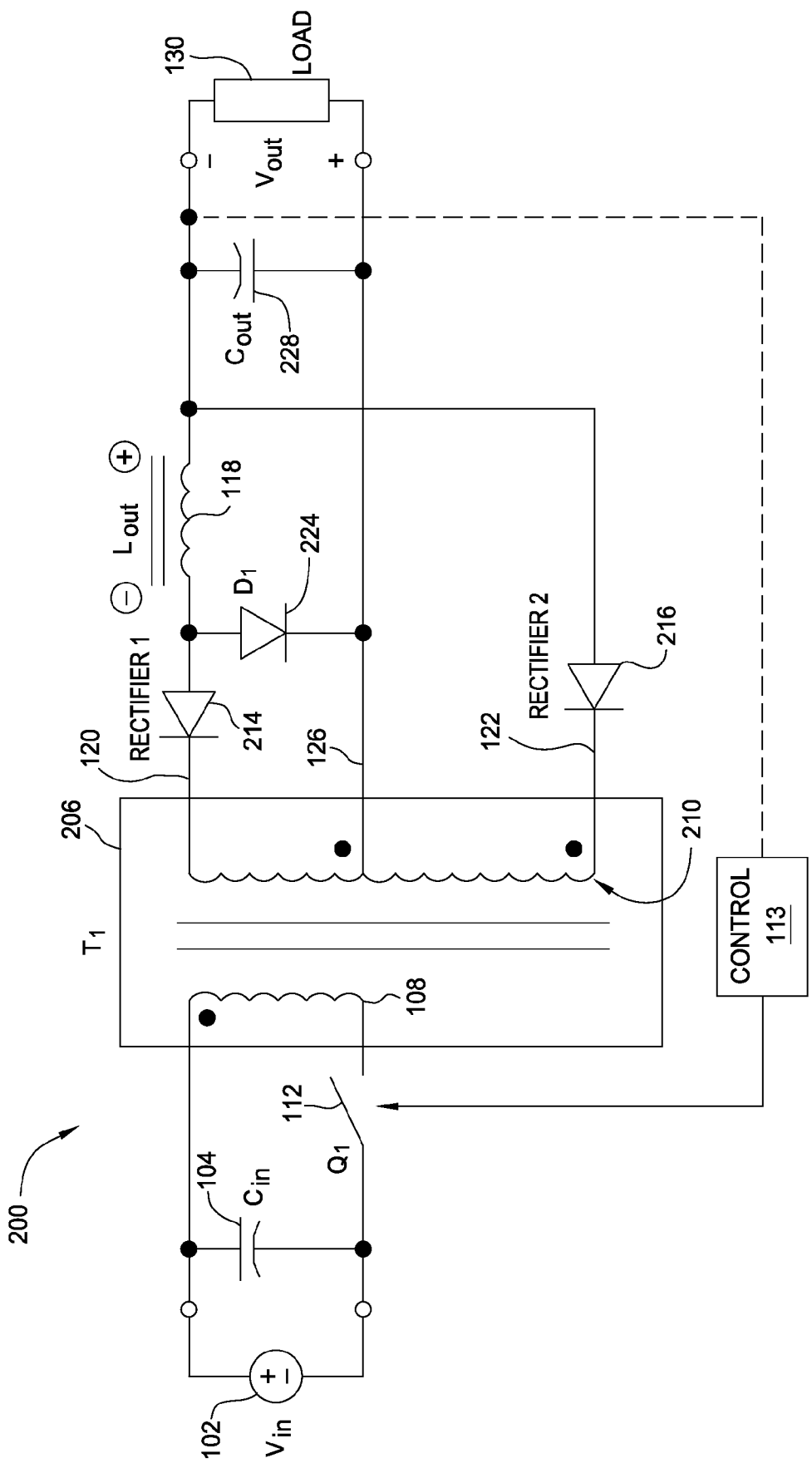
FIG. 2 illustrates a fly-forward converter topology for a single-ended negative output voltage in accordance with an embodiment of the present invention.

Referring now to FIG. 2, a fly-forward converter topology 200 for converting the input voltage ($V_{in}$) to a single-ended negative output voltage ($V_{out}$) is illustrated. The converter topology 200 operates in a similar manner as the fly-forward converter topology 100 of FIG. 1 for the positive output voltage, but with a few exceptions. For example, the primary winding 108 of transformer 206 may have an opposite winding orientation as the tapped secondary winding 210 as illustrated by the dot convention in FIG. 2. The polarities of the first rectifier 214, the second rectifier 216, and the freewheeling diode 224 should be reversed from the polarities of the corresponding components in the topology 100 of FIG. 1. Furthermore, the polarity of any polarized capacitors in the output bulk capacitance ($C_{out}$) 228 should be reversed, as well.

In operation, the switch 112 may be closed by a signal from the control logic 113 to begin the forward phase, and the primary side may behave as described above. The change in primary winding voltage may generate a voltage across the secondary winding 210 according to the turns ratio of the transformer 206. Because of the opposite winding orientations, the first rectifier 214 may be forward-biased, allowing current to flow from the tap terminal 126 of the secondary winding 210 to the load 130. The forward phase current may return from the load 130 through the output inductor 118 and the first rectifier 214 to the first terminal 120 of the secondary winding 210. Thereby, a negative output voltage is created with respect to the tap terminal 126.

Once the control logic 113 determines the switch 112 should be opened according to the desired duty cycle or the feedback signal, for example, the switch 112 may be opened to enter the flyback phase. When the switch 112 is opened, the transformer voltage polarities may reverse to maintain current flow as described above. Because the second rectifier 216 is forward-biased during the flyback phase according to this polarity reversal, current may flow from the tap terminal 126 of the secondary winding 210 to the load 130. The current may return from the load 130 through the second rectifier 216 to the second terminal 122 of the secondary winding 210. Furthermore, the polarity of the output inductor 118 may reverse during the flyback phase because the inductor's magnetic field acts to maintain current flow as described above. Thus, the freewheeling diode 224 may be forward-biased and allow current to flow through the output inductor 118 during the flyback phase.

Again, because the second rectifier 216 is coupled to the output bulk capacitance 228 and the output side of $L_{out}$ 118 rather than to the other side of $L_{out}$ 118 to which the first rectifier 214 is coupled, the output voltage is seen across the transformer 206, and the magnetizing energy of the transformer core may be automatically dumped into the output bulk capacitance 228 during the flyback phase in an effort to reset the core. This is in contrast to conventional converters where the core cannot be immediately reset because the magnetizing energy has to be delivered through the output inductor 118.

An Example Fly-Forward Converter with a Feedback Winding

Figure 3:
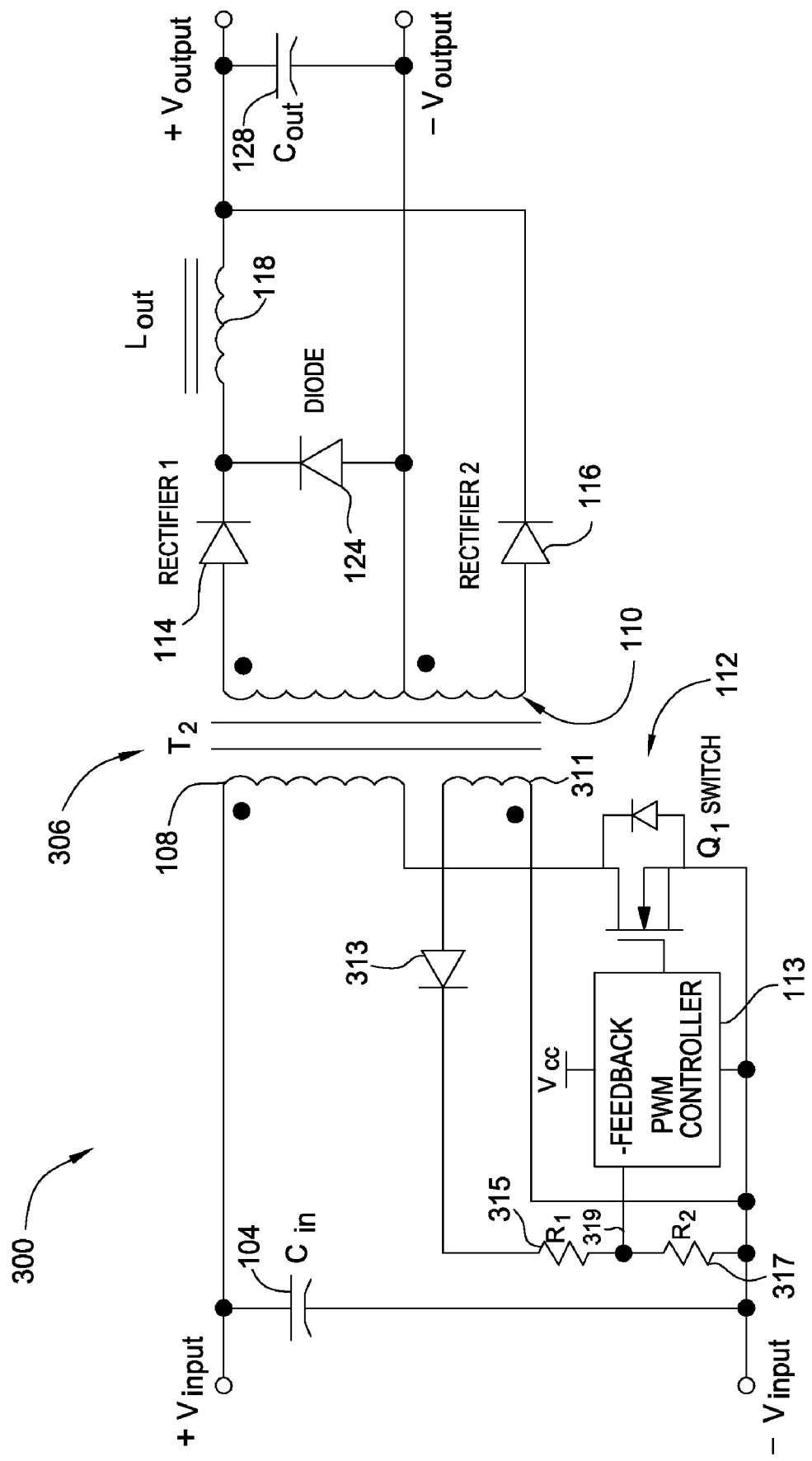
FIG. 3 illustrates a fly-forward converter having a primary-side voltage-sensing feedback winding in accordance with an embodiment of the present invention.

Referring now to FIG. 3, a schematic 300 for a fly-forward converter is illustrated according to some embodiments. In the schematic 300, an n-channel MOSFET functions as the switch 112, where the drain is electrically coupled to the primary winding 108 of the transformer ($T_2$) 306 and the source is electrically coupled to the reference point for the input voltage. The gate of the NMOS may be driven by the control logic 113, which is illustrated as a PWM controller in FIG. 3. Like the source of the NMOS, the reference point for the PWM controller may be coupled to the reference point for the input voltage as depicted. Power for the PWM controller may be provided by a voltage source $V_{CC}$, which may have a voltage derived from the input voltage ($V_{in}$).

The transformer 306 may include a voltage sensing feedback winding 311 in addition to the primary and secondary windings 108, 110. The feedback winding 311 may have a winding orientation opposite to that of the primary and secondary windings as illustrated by the dot convention in FIG. 3. The feedback winding 311 may be coupled to the reference point for the input voltage at one end and to the anode of a diode 313 at the other end. The cathode of the diode 313 may be coupled to a first feedback resistor ($R_1$) 315 in series with a second feedback resistor ($R_2$) 317. A tap 319 between the series resistors 315, 317 may be input to a terminal of the PWM controller, labeled as "-FEEDBACK" in FIG. 3. Depending on the turns ratio of the feedback winding 311, the first feedback resistor 315 may be replaced by a short for some embodiments.

During the on period of the switch 112 (i.e., the forward phase), the diode 313 should be reverse-biased such that no current flows through the series resistors 315, 317 and the voltage at the tap 319 may be approximately equal to the reference point for the input voltage. During the off period of the switch 112 (i.e., the flyback phase) however, the diode 313 may be forward-biased such that a divided-down version of the voltage across the feedback winding 311 minus the forward voltage drop of the diode 313 may be input to the PWM controller. The voltage at the tap 319 may be used as closed loop control of the gate drive for the NMOS serving as the switch 112. With this feedback, the PWM controller may adjust the duty cycle to achieve the desired output voltage ($V_{out}$).

An Example Two-Switch Fly-Forward Converter

Figure 4A:
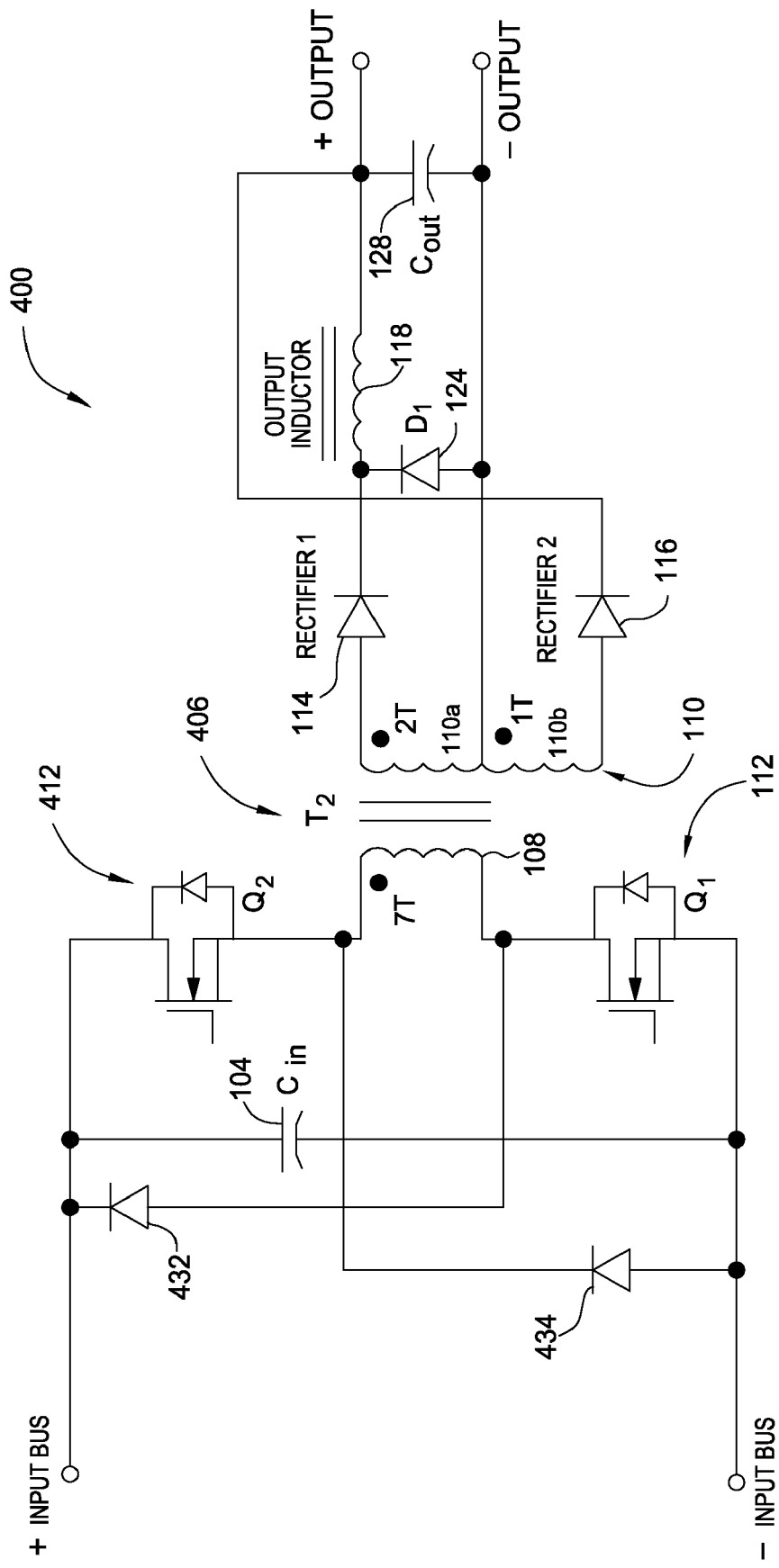
FIG. 4A illustrates a fly-forward converter having two primary-side switches in accordance with an embodiment of the present invention.

FIG. 4A illustrates a schematic 400 of a fly-forward converter in accordance with certain embodiments. In the schematic 400, the turns ratio of the primary winding 108 to the first portion 110a to the second portion 110b of the secondary winding 110 is 7:2:1 in the transformer 406. In this manner, an input voltage ($V_{in}$) of 36 to 75 V, which may occur on a voltage bus in some applications, may be converted to an output voltage ($V_{out}$) of about 5 V using a duty cycle of about 50% down to about 23%.

As portrayed in FIG. 4A, some embodiments of the fly-forward converter may comprise two primary-side switches ($Q_1$ and $Q_2$) 112, 412, one on either end of the primary winding 108 of the transformer 406. Either or both of the switches 112, 412 may be n-channel MOSFETs (as shown), BJTs, or SSRs, for example. The switches 112, 412 may both be closed in the forward phase of the fly-forward converter, and either one or both of the switches 112, 412 may be open in the flyback phase.

The anode of a first clamp diode 432 may be electrically coupled to the drain of the first switch 112, and the cathode of the first clamp diode 432 may be coupled to $V_{in}$. In a similar manner, the cathode of a second clamp diode 434 may be electrically coupled to the source of the second switch 412, and the anode of the second clamp diode 434 may be coupled to the reference point for $V_{in}$. Also known as snubber diodes, the purpose of the clamp diodes 432, 434 may be to protect the switches 112, 412 by preventing the voltage across the switches ($V_{DS}$) from substantially exceeding the input voltage ($V_{in}$) when the transformer 406 reverses polarity as the fly-forward converter alternates between the forward phase and the flyback phase. The clamp diodes 432, 434 may most likely be reverse-biased during the forward phase, but at least one of the clamp diodes may be forward-biased during the flyback phase.

Figure 4B:
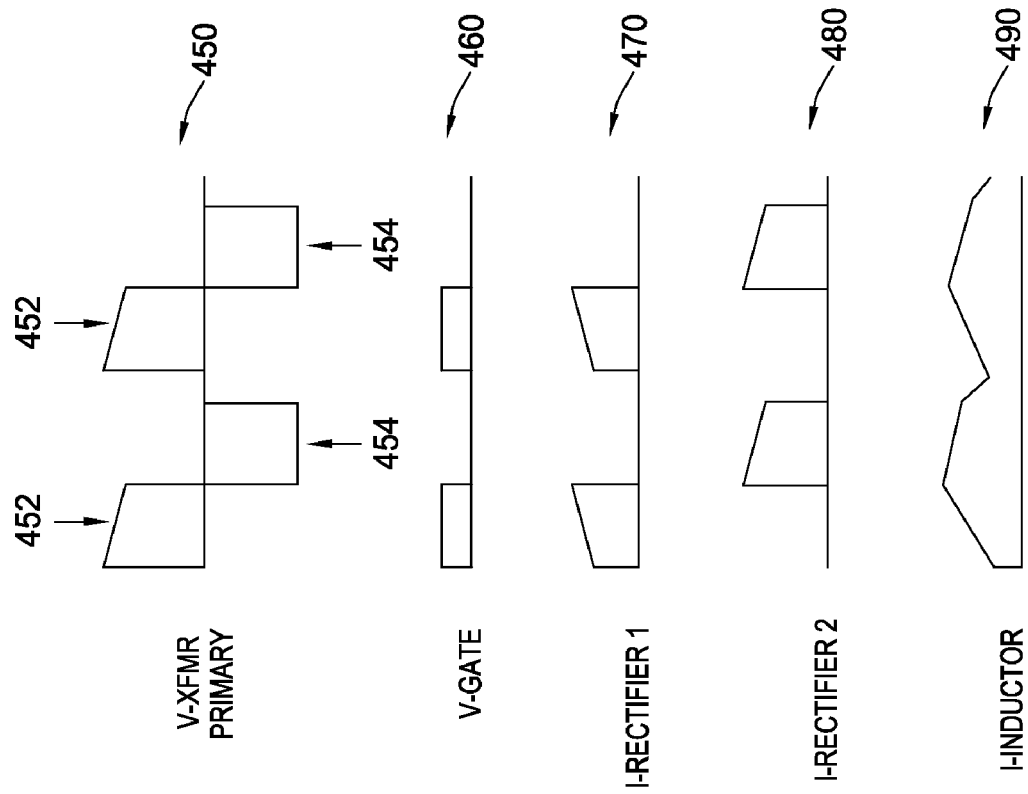
FIG. 4B illustrates example waveforms during operation of the fly-forward converter of FIG. 4A in accordance with an embodiment of the present invention.

FIG. 4B illustrates example waveforms during operation of the fly-forward converter of FIG. 4A, which are also applicable to FIGS. 1-3. Waveform 450 may represent the voltage across the primary winding 108 of the transformer 406. Waveform 460 may illustrate the gate voltage of either NMOS switch 112, 412 with respect to either source voltage. When the gate voltages are above the threshold voltages ($V_{Th}$) in waveform 460 for both of the NMOS switches 112, 412, current may flow through the primary winding 108, thereby causing the voltage across the primary winding 108 to jump up to nearly $V_{in}$, as illustrated in the forward phase 452 of waveform 450. During the forward phase 452, current may suddenly jump up and then rise linearly through the first rectifier 114 as the output inductor 118 is charged, as illustrated in waveform 470. However, the second rectifier 116 may most likely be reverse-biased during the forward phase 452 and have nearly zero current flowing through it, as illustrated in waveform 480.

When the gate voltage in waveform 460 drops below the threshold voltage ($V_{Th}$) to nearly zero for at least one of the NMOS switches 112, 412, the voltage across the primary winding 108 may most likely reverse polarity as the transformer's magnetic field tries to maintain current flow, as illustrated in the flyback phase 454 of waveform 450. During the flyback phase 454, the first rectifier 114 may most likely be reverse-biased and have nearly zero current flowing through it, as illustrated in waveform 470. However, current may suddenly jump up and then fall linearly through the second rectifier 116 during the flyback phase 454, as illustrated in waveform 480.

Waveform 490 illustrates the current through the output inductor 118. Output inductor current may be the same as the current through the first rectifier (waveform 470) during the forward phase 452. However, during the flyback phase 454, the output inductor current may be supplied by the freewheeling diode 124. The output inductor current may decrease linearly as the output inductor 118 is discharged.

An Example Two-Switch Fly-Forward Converter Using a Synchronous Rectifier

Figure 5:
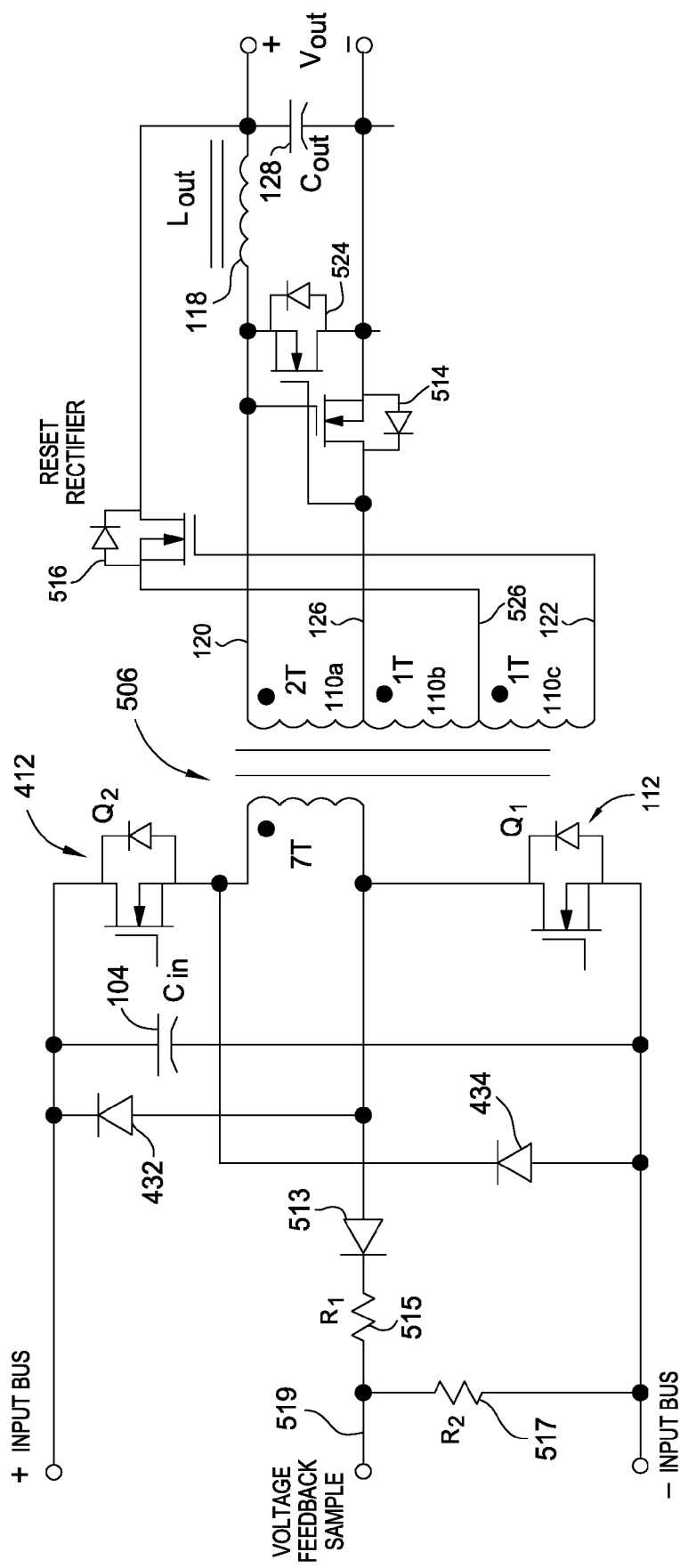
FIG. 5 illustrates a fly-forward converter having two primary-side switches and a synchronous rectifier and using a reflected output voltage as feedback in accordance with an embodiment of the present invention.

FIG. 5 illustrates a schematic 500 of a fly-forward converter in accordance with certain embodiments. In the schematic 500, the transformer 506 may have a secondary winding 110 with two taps 126, 526. The turns ratio of the primary winding 108 to the first portion 110a to the second portion 110b to the third portion 110c of the secondary winding 110 is 7:2:1:1 in the illustrated example transformer 506. Schematic 500 also employs two primary-side switches 112, 412 and two clamp diodes 432, 434 as described above with respect to FIG. 4A.

Rather than using diodes as rectifiers, the schematic 500 of FIG. 5 utilizes synchronous rectifiers 514, 516, which may be n-channel MOSFETs as shown. Synchronous rectifiers may offer even lower on-state voltage drops than Schottky diodes. The drain of the first synchronous rectifier 514 may be electrically coupled to the first tap terminal 126, and the source may be coupled to the reference point for the output voltage ($V_{out}$). The gate of the first synchronous rectifier 514 may be electrically coupled to the first terminal 120 and one side of the output inductor 118 such that this NMOS is on (i.e., the switch is closed) during the forward phase and off (i.e., the switch is open) during the flyback phase. Similarly, the drain of the second synchronous rectifier 516 may be electrically coupled to the bulk output capacitance 128 and the other side of the output inductor 118, and the source may be coupled to the second tap terminal 526. The gate of the second synchronous rectifier 516 may be coupled to the second terminal 122 such that this NMOS is off during the forward phase and on during the flyback phase.

An NMOS may also serve as the freewheeling diode 524 as illustrated in FIG. 5. In this case, the drain of the NMOS may be electrically coupled to the first terminal 120 of the secondary winding and to the output inductor 118, and the source may be coupled to the reference point for the output voltage ($V_{out}$). The gate of the NMOS serving as the freewheeling diode 524 may be coupled to the first tap terminal 126 such that this NMOS is off during the forward phase and on during the flyback phase.

In an effort to use the reflected output voltage as isolated voltage feedback, one end of the primary winding 108 and the drain of the switch 112 may be coupled to the anode of a diode 513 at the other end. The cathode of the diode 513 may be coupled to a first feedback resistor ($R_1$) 515 in series with a second feedback resistor ($R_2$) 517. A tap 519 between the series resistors 515, 517 may be input to the control logic 113 as feedback for closed loop control of the fly-forward converter. Depending on the input voltage ($V_{in}$) and the supply voltage of the control logic, the first feedback resistor 515 may be replaced by a short for some embodiments.

Furthermore, different portions of the example embodiments of a fly-forward converter described above may be combined to realize further embodiments. For example, the feedback winding 311, diode 313, and series resistors 315, 317 of FIG. 3 could be added to the schematic 400 of FIG. 4A in an effort to provide feedback to the control logic 113.

While the foregoing is directed to embodiments of the present invention, other and further embodiments of the invention may be devised without departing from the basic scope thereof, and the scope thereof is determined by the claims that follow.

The invention claimed is:

1. An apparatus, comprising:
    a transformer having a primary winding and a tapped secondary winding, the secondary winding having a first terminal, a second terminal, and a tap terminal;
    a first switching device coupled to the primary winding for generating changes in voltage across the primary winding such that the primary winding transfers energy to the secondary winding;
    an output inductor having first and second ends;
    a first rectifier coupled to the first terminal of the secondary winding and to the first end of the output inductor;
    an output capacitor coupled to the second end of the output inductor and to the tap terminal of the secondary winding; and
    a second rectifier coupled to the second terminal of the secondary winding and directly coupled to the second end of the output inductor, wherein the polarity of the first rectifier from the first terminal of the secondary winding is the same as the polarity of the second rectifier from the second terminal of the secondary winding.

2. The apparatus of claim 1, further comprising a freewheeling diode coupled to the tap terminal and to the first end of the output inductor.

3. The apparatus of claim 2, wherein the anode of the freewheeling diode is coupled to the tap terminal and the cathode of the freewheeling diode is coupled to the first end of the output inductor.

4. The apparatus of claim 1, wherein the first or the second rectifier comprises a diode, a Schottky diode, or a metal oxide semiconductor field effect transistor (MOSFET).

5. The apparatus of claim 1, wherein the first and the second rectifiers are synchronous rectifiers.

6. The apparatus of claim 1, wherein the the first switching device comprises a metal oxide semiconductor field effect transistor (MOSFET), a bipolar junction transistor (BJT), or a solid state relay (SSR).

7. The apparatus of claim 1, further comprising control logic to control operation of the first switching device.

8. The apparatus of claim 7, wherein the transformer comprises a primary-side feedback winding for providing feedback of an output voltage across the output capacitor to the control logic.

9. The apparatus of claim 1, further comprising a second switching device coupled to the primary winding on an opposite end from the first switching device.

10. The apparatus of claim 9, further comprising control logic to control the operation of the first and second switching devices.

11. An apparatus, comprising:
    a transformer having a primary winding and a tapped secondary winding, the secondary winding having a first terminal, a second terminal, and a tap terminal;
    a means for switching coupled to the primary winding for generating changes in voltage across the primary winding such that the primary winding transfers energy to the secondary winding;
    an output inductor having first and second ends;
    a first means for rectifying coupled to the first terminal of the secondary winding and to the first end of the output inductor;
    an output capacitor coupled to the second end of the output inductor and to the tap terminal of the secondary winding; and
    a second means for rectifying coupled to the second terminal of the secondary winding and directly coupled to the second end of the output inductor.

12. The apparatus of claim 11, wherein the polarity of the first means for rectifying from the first terminal of the secondary winding is the same as the polarity of the second means for rectifying from the second terminal of the secondary winding.

13. The apparatus of claim 11, further comprising a freewheeling diode coupled to the tap terminal of the secondary winding and to the first end of the output inductor.

14. A method, comprising:
- in a first state, closing a switching device coupled to a primary winding of a transformer such that current flows through a load and a first rectifier coupled between a first end of an output inductor and a first terminal of a tapped secondary winding of the transformer;
- in a second state, opening the switching device such that current flows through the load and a second rectifier directly coupled between a second end of the output inductor and a second terminal of the secondary winding, wherein the load is coupled between the second end of the output inductor and a tap terminal of the secondary winding; and alternating between the first state and the second state.

15. The method of claim 14, wherein a core of the transformer is reset during the second state by an output voltage across the load.

16. The method of claim 14, wherein the polarity of the first rectifier from the first terminal of the secondary winding is the same as the polarity of the second rectifier from the second terminal of the secondary winding.

17. The method of claim 16, wherein an anode of the first rectifier is coupled to the first terminal of the secondary winding and an anode of the second rectifier is coupled to the second terminal of the secondary winding.

18. The method of claim 14, wherein current flows through the output inductor and a freewheeling diode in the second state, the freewheeling diode coupled between the tap terminal of the secondary winding and the first end of the output inductor.

19. The method of claim 18, wherein an anode of the freewheeling diode is coupled to the tap terminal of the secondary winding and a cathode of the freewheeling diode is coupled to the first end of the output inductor.

20. The method of claim 14, wherein a duty cycle between the first state and the second state is greater than or equal to 50%.

* * * * *